US012456815B2

(12) United States Patent
Lim et al.

(10) Patent No.: US 12,456,815 B2
(45) Date of Patent: Oct. 28, 2025

(54) METHOD FOR MANUFACTURING A RADAR ANTENNA

(71) Applicant: AMOSENSE CO., LTD, Cheonan-si (KR)

(72) Inventors: Jongin Lim, Cheonan-si (KR); Seho Lee, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 340 days.

(21) Appl. No.: 18/008,420

(22) PCT Filed: May 31, 2021

(86) PCT No.: PCT/KR2021/095067
§ 371 (c)(1),
(2) Date: Dec. 5, 2022

(87) PCT Pub. No.: WO2021/246849
PCT Pub. Date: Dec. 9, 2021

(65) Prior Publication Data

US 2023/0231314 A1 Jul. 20, 2023

(30) Foreign Application Priority Data

Jun. 5, 2020 (KR) ........................ 10-2020-0068326

(51) Int. Cl.
*H01Q 13/10* (2006.01)
*G01S 7/03* (2006.01)

(52) U.S. Cl.
CPC ............ *H01Q 13/106* (2013.01); *G01S 7/03* (2013.01)

(58) Field of Classification Search
CPC .. H01Q 13/106; H01Q 1/3233; H01Q 21/005; H01Q 13/22; H01Q 19/15; Y10T 29/49007; Y10T 29/49016; Y10T 29/4918
See application file for complete search history.

(56) References Cited

U.S. PATENT DOCUMENTS 6,429,825 B1 * 8/2002 Martek .................. H01Q 13/18 343/770
7,397,432 B2 7/2008 Ku et al.
(Continued)

FOREIGN PATENT DOCUMENTS

JP 2020-031426 A 2/2020
KR 10-2006-0025884 A 3/2006
(Continued)

OTHER PUBLICATIONS

KR Office Action dated Jun. 27, 2024 as received in Application No. 10-2020-0068326.

*Primary Examiner* — Donghai D Nguyen
(74) *Attorney, Agent, or Firm* — Maschoff Brennan

(57) ABSTRACT

Proposed are a radar antenna configured to form a wave-guide through a partition wall on a plate having a plurality of slots, and a method for manufacturing same. The proposed radar antenna comprises: a first plate having an inner surface; and a second plate stacked so as to have an inner surface facing the inner surface of the first plate, wherein the first plate includes a partition wall extending in the direction of the second plate from the inner surface of the first plate, and the partition wall contacts the inner surface of the second plate to form a waveguide between the inner surface of the first plate and the inner surface of the second plate.

6 Claims, 11 Drawing Sheets

(56) References Cited

U.S. PATENT DOCUMENTS

| | | | | |
|---|---|---|---|---|
| 8,558,746 | B2 * | 10/2013 | Thomson | H01Q 21/0075 343/770 |
| 9,685,708 | B2 * | 6/2017 | Sonozaki | H01Q 13/10 |
| 2012/0007771 | A1 | 1/2012 | Miyagawa et al. | |
| 2018/0034140 | A1 | 2/2018 | Chen et al. | |
| 2020/0059000 | A1 | 2/2020 | Kamo et al. | |

FOREIGN PATENT DOCUMENTS

| | | | |
|---|---|---|---|
| KR | 10-0865956 | B1 | 10/2008 |
| KR | 10-2013-0054142 | A | 5/2013 |
| KR | 10-2017-0112720 | A | 10/2017 |
| KR | 10-2018-0116032 | A | 10/2018 |
| KR | 10-2019-0021494 | A | 3/2019 |
| KR | 10-2020-0058661 | A | 5/2020 |

* cited by examiner

[FIG. 1]
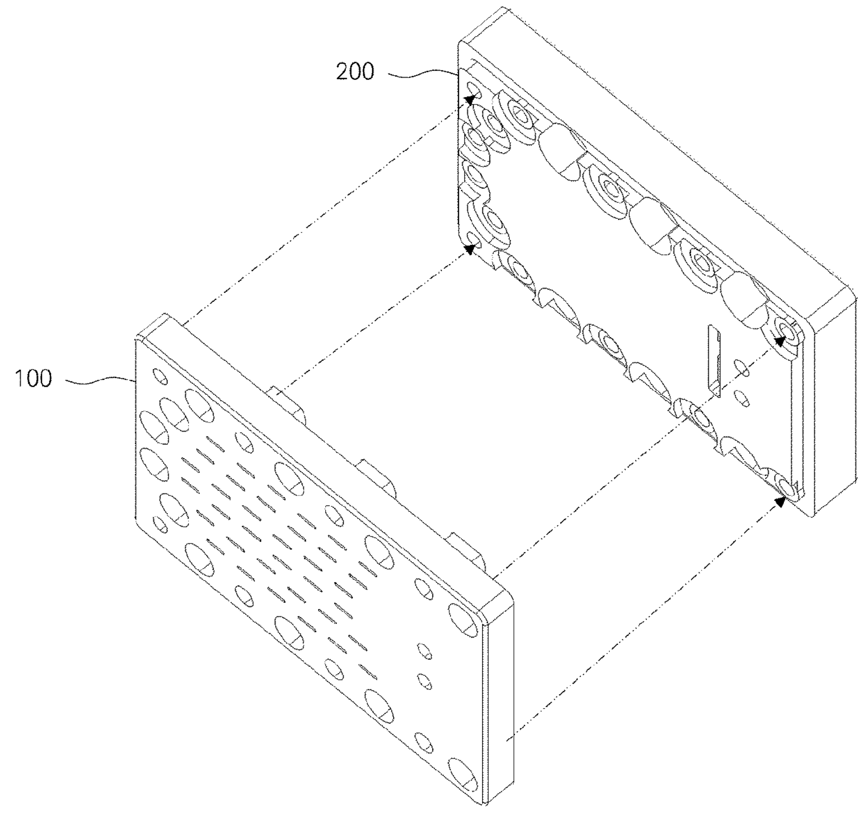

[FIG. 2]
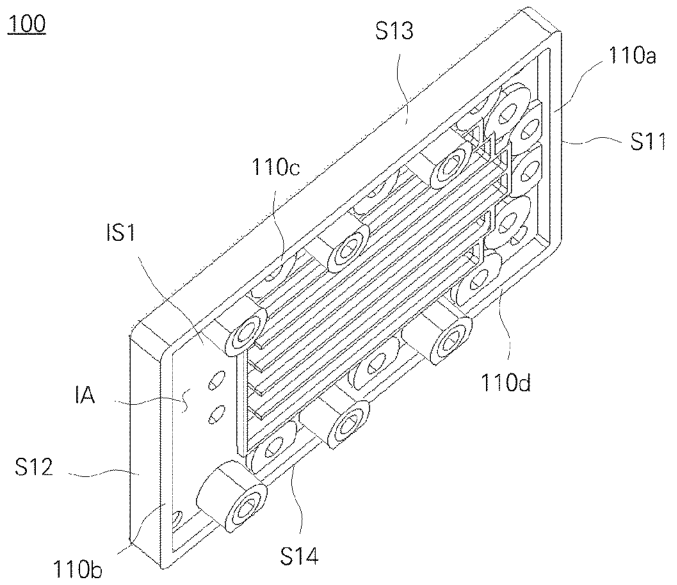
[FIG. 3]
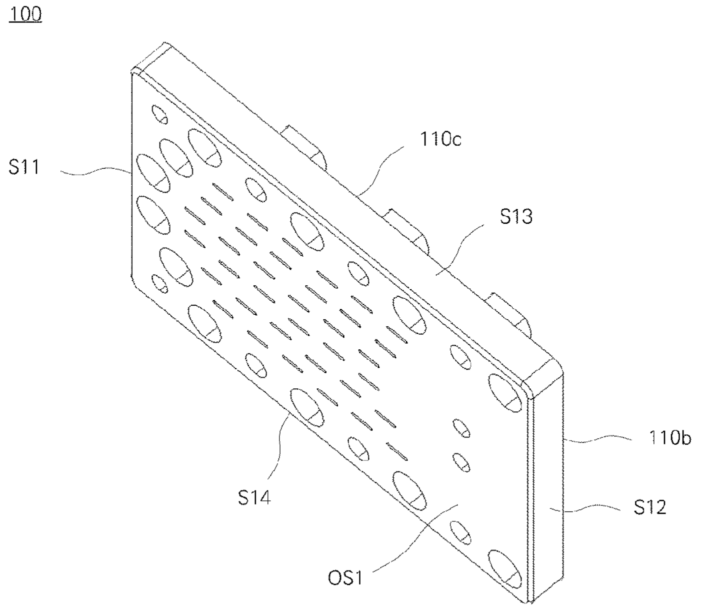

[FIG. 4]
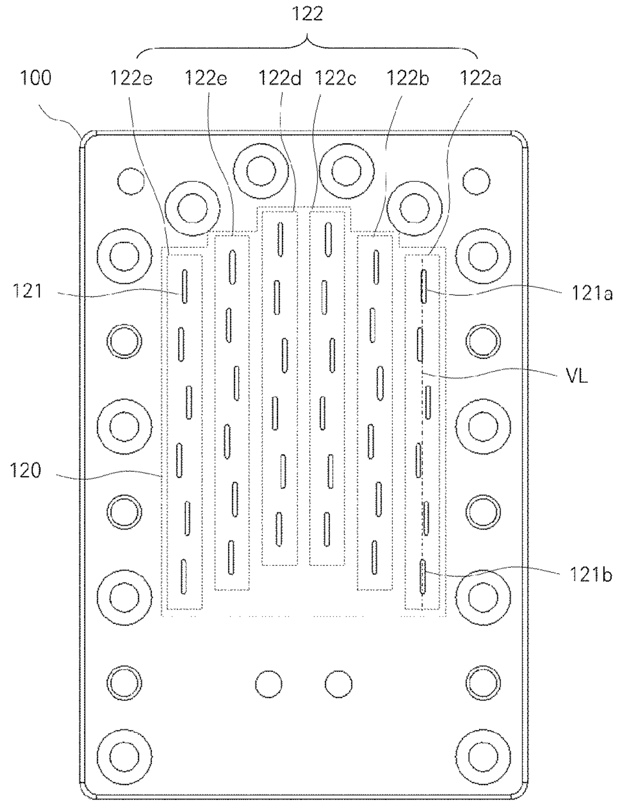

[FIG. 5]
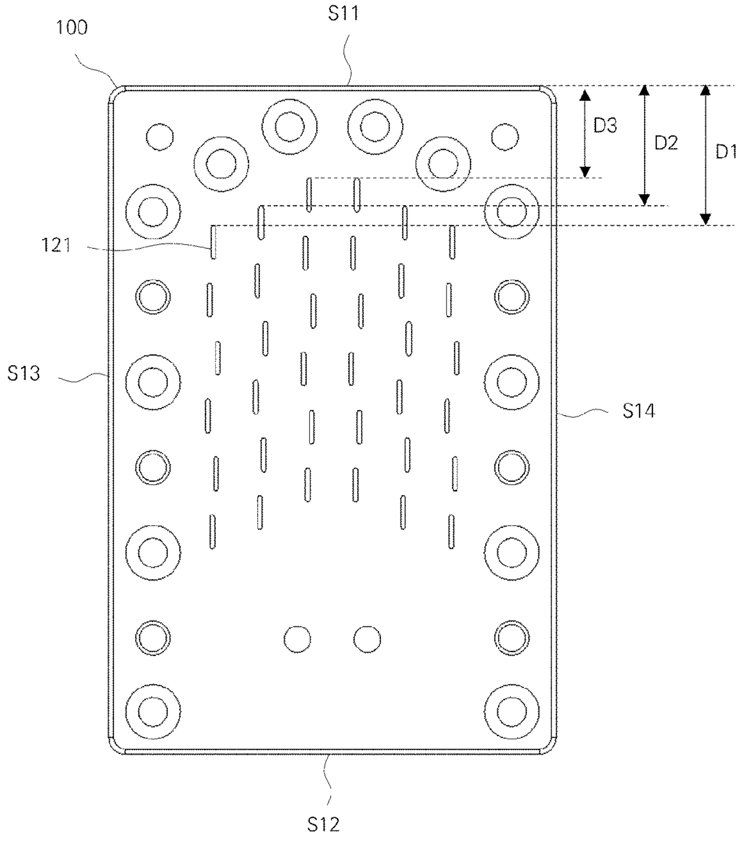

[FIG. 6]
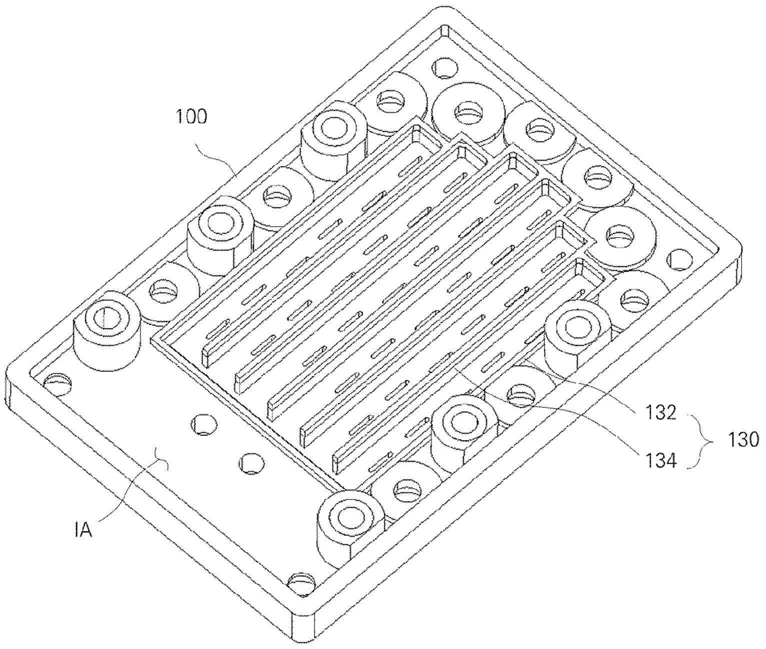

[FIG. 7]
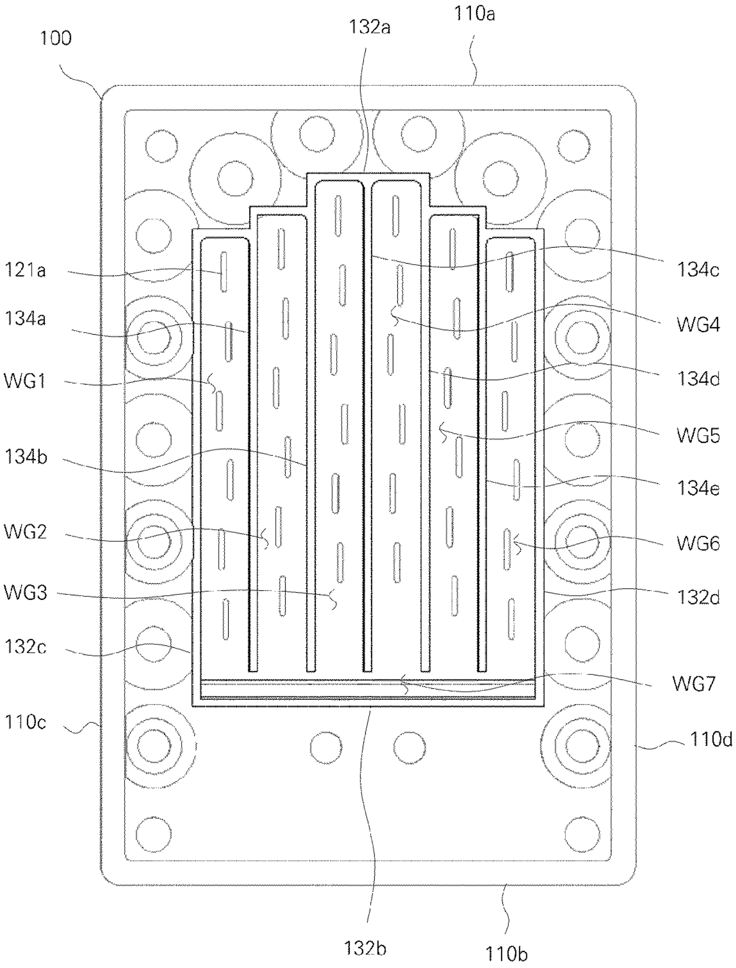

[FIG. 8]
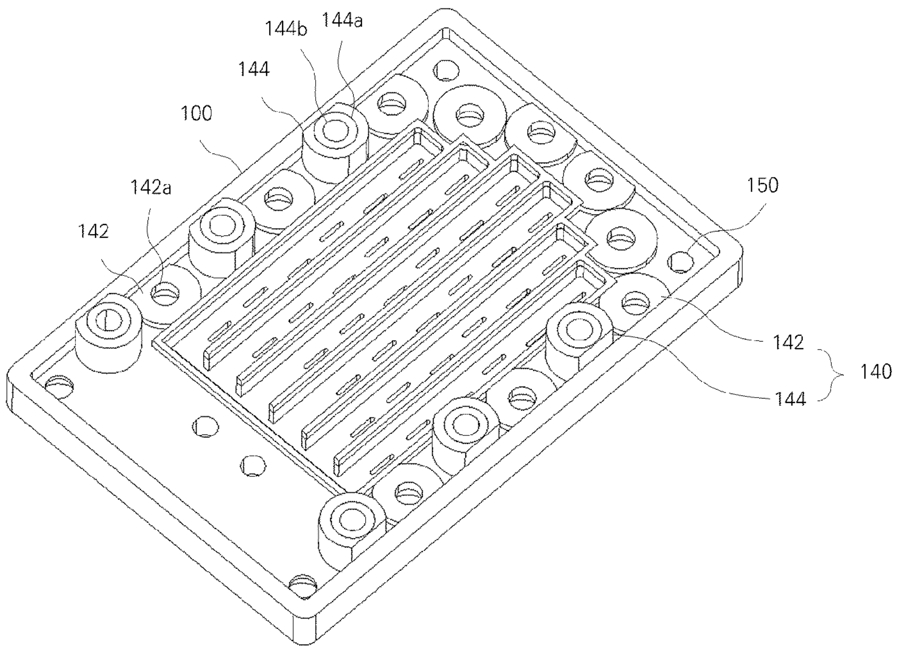
[FIG. 9]
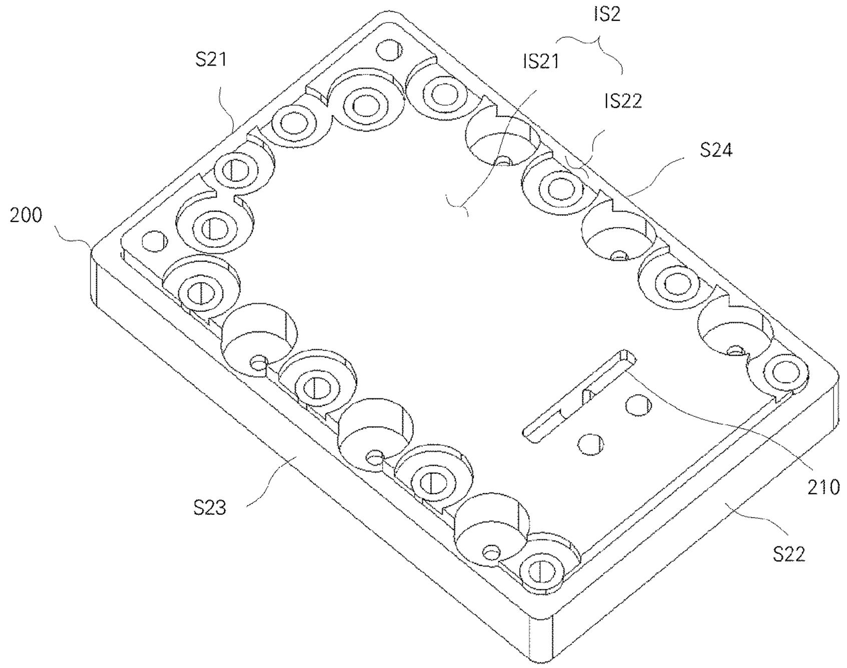

[FIG. 10]
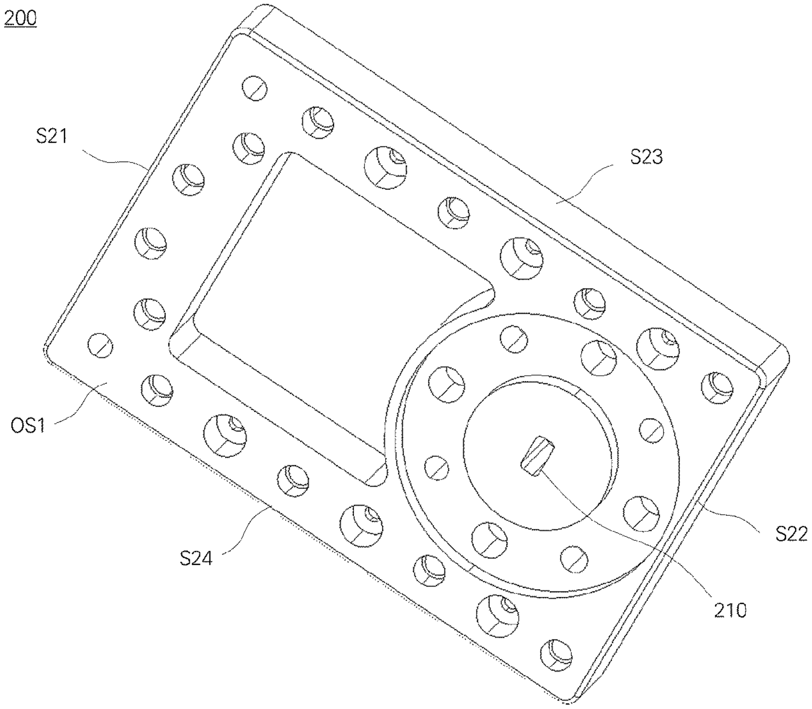
[FIG. 11]
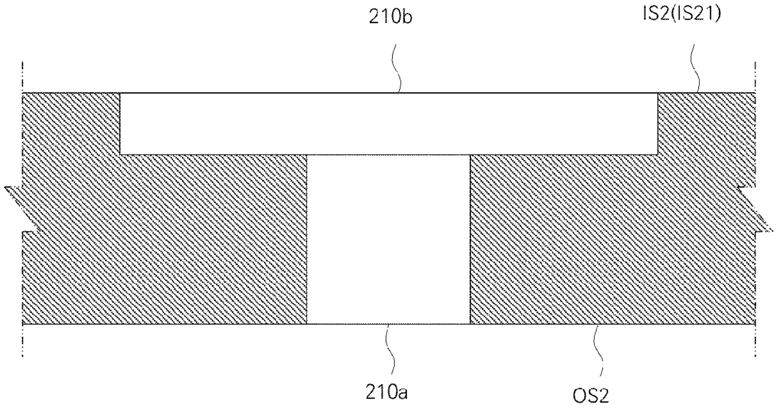

[FIG. 12]
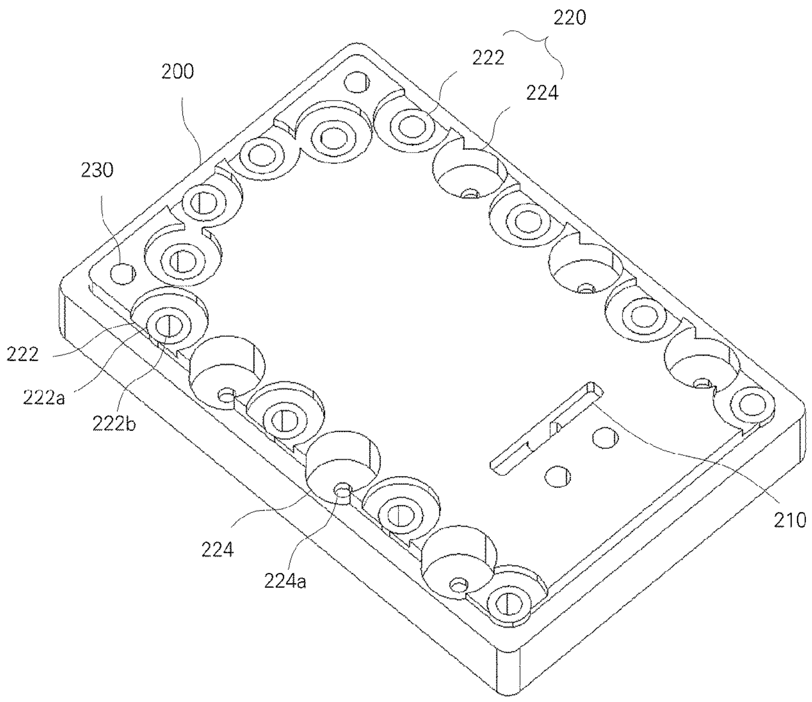
[FIG. 13]
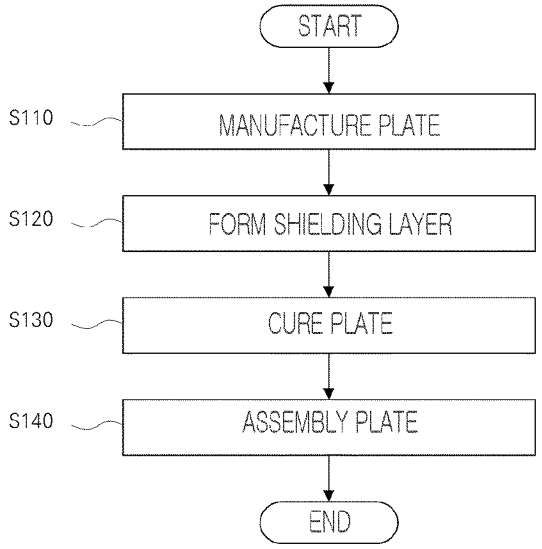

[FIG. 14]
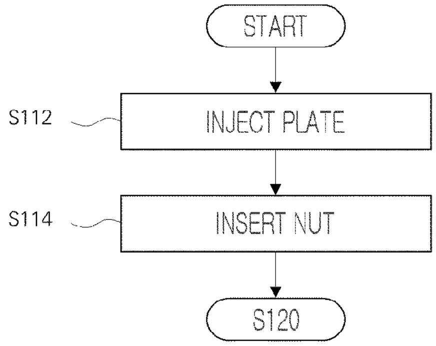
[FIG. 15]
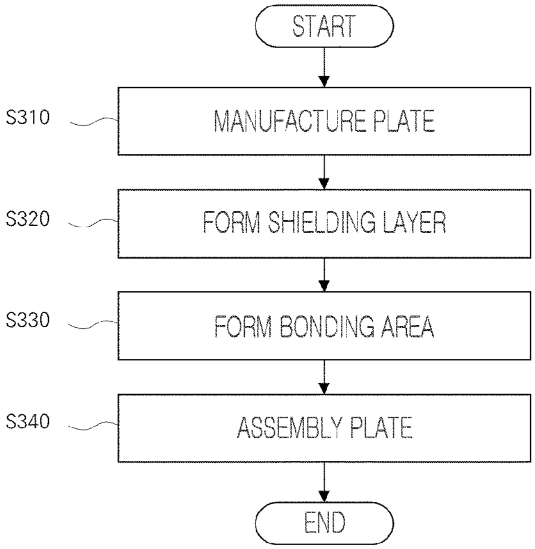

[FIG. 16]
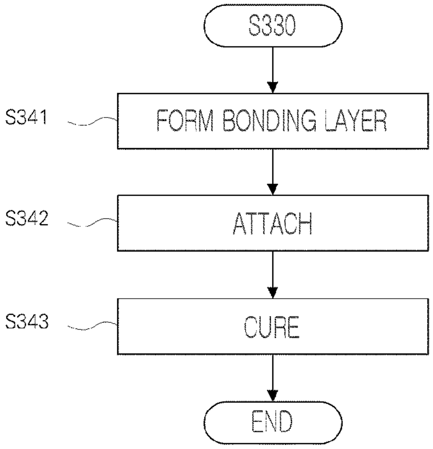

METHOD FOR MANUFACTURING A RADAR ANTENNA

TECHNICAL FIELD

The present disclosure relates to an antenna, and more particularly, to a radar antenna.

BACKGROUND ART

Radar antennas tend to be used to transmit and receive signals for detecting objects around a vehicle. The radar antenna radiates radio waves to enable the presence or absence of an object, a distance, a movement direction, a movement speed, identification, classification, etc., of the object by reflected waves or scattered waves generated by the collision of the radio waves with the object.

As for the radar antennas, technologies are being researched to expand a detection range and improve performance in order to improve an anti-collision radar of autonomous driving vehicles in preparation for the era of unmanned vehicles.

However, the conventionally researched radar antennas have problems such as increased weight due to the use of metal, difficulty in assembling as a waveguide is formed by stacking a plurality of plates, and reduced reliability and performance due to eccentricity etc., which occurs during assembly.

DISCLOSURE

Technical Problem

An object of the present disclosure is to provide a radar antenna in which a waveguide is configured through a partition wall on a plate having a plurality of slots, and a method for manufacturing the same.

Technical Solution

According to a characteristic of the present disclosure for achieving the object, the present disclosure includes a radar antenna including a first plate having an inner surface, and a second plate stacked so as to have an inner surface facing the inner surface of the first plate, in which the first plate includes a partition wall extending in the direction of the second plate from the inner surface of the first plate, and the partition wall contacts the inner surface of the second plate to form a waveguide between the inner surface of the first plate and the inner surface of the second plate.

The first plate may further include a slot part including a plurality of slots penetrating through the first plate, and the partition wall may include an outer partition wall that is disposed along an outer circumference of the slot part and configured to form the waveguide surrounding the slot part. The partition wall may further include a plurality of inner partition walls disposed inside the waveguide, and the inner partition wall may be disposed between two adjacent slot rows among a plurality of slot rows configured by the plurality of slots. The plurality of inner partition walls may divide the waveguide into a plurality of conduits, and the conduit may surround one of the plurality of slot rows. The plurality of inner partition walls may have a first end portion contacting the outer partition wall, and a second end portion opposite to the first end portion may be spaced apart from the outer partition wall to form a conduit between the second end portion and the outer partition wall.

The first plate may include an outer wall that is formed along an outer circumference of the inner surface of the first plate and extends in a direction from the inner surface of the first plate to the inner surface of the second plate.

The first plate may further include a plurality of coupling protrusions that protrude in the direction of the first plate, and an insert nut may be molded in at least one of the plurality of coupling protrusions.

The inner surface of the second plate may include: a first inner surface contacting the partition wall of the first plate, and a second inner surface that is located closer to an outer surface of the second plate than the first inner surface and contacts an outer wall of the first plate.

The second plate may further include a port that penetrates through the second plate and is disposed to overlap a conduit formed between a second end portion of an inner partition wall of the first plate and an outer partition wall among the waveguides.

The second plate may further include a plurality of coupling grooves each accommodating a plurality of coupling protrusions formed on the first plate, and an insert nut may be molded into one or more of the plurality of coupling grooves.

According to a characteristic of the present disclosure for achieving the object, the present disclosure includes a method for manufacturing a radar antenna including manufacturing a plate-shaped first plate and second plate in which an insert nut is in-molded, forming a shielding layer on surfaces of the first plate and the second plate, curing the first plate and the second plate on which the shielding layer is formed, and assembling the first plate and the second plate cured in the curing.

In the manufacturing, the first plate and the second plate in which the insert nut is in-molded may be injected through an in-molding injection process, and then cooled.

The manufacturing may include: injecting the first plate and the second plate in which an insertion space is formed; and inserting the insert nuts into the insertion spaces of the first plate and the second plate.

According to a characteristic of the present disclosure for achieving the object, the present disclosure includes, a method for manufacturing a radar antenna including manufacturing a first plate and a second plate through an injection process, forming a shielding layer on surfaces of the first plate and the second plate, forming a bonding area on the first plate and the second plate by cutting a portion of the shielding layer of the first plate and the second plate, and bonding the first plate and the second plate.

In the bonding, the first plate and the second plate may be bonded by melting a bonding area of the first plate and the second plate through an ultrasonic welding process.

The bonding may include: forming the bonding layer on the bonding area of the first plate and the second plate through an epoxy discharging process; attaching the bonding layer by applying pressure in a stacked state of the first plate and the second plate; and curing the bonding layer through one of an oven curing process and a natural curing process.

Advantageous Effects

The present disclosure has effects in that it is possible to prevent a signal from leaking while maintaining flatness of a plate by configuring a waveguide through a partition wall on the plate having a plurality of slots. That is, the radar antenna can prevent the signal from leaking and maintain the flatness of the plate by erecting the partition wall around a transmission line.

In addition, the radar antenna and the method for manufacturing the same have an effect of strengthening a coupling force of plates while simplifying the manufacturing process by stacking and assembling the plates on which an insert nut is molded.

In addition, the radar antenna and the method for manufacturing the same have an effect of strengthening a coupling force of plates while simplifying the manufacturing process by stacking and assembling the plates on which an insert nut is molded.

In addition, the method for manufacturing a radar antenna has an effect of preventing the deterioration in the antenna performance due to the signal leakage by inserting an insert nut after injecting the plate to prevent the warping of the plate from occurring.

DESCRIPTION OF DRAWINGS

FIG. 1 is a diagram for describing a radar antenna according to an embodiment of the present disclosure.

FIGS. 2 and 3 are diagrams for describing an outer wall formed on a first plate of FIG. 1.

FIGS. 4 and 5 are diagrams for describing a slot part formed on the first plate of FIG. 1.

FIGS. 6 and 7 are diagrams for describing a partition wall formed on the first plate of FIG. 1.

FIG. 8 is a view for describing a coupling protrusion and a fastening hole formed on the first plate of FIG. 1.

FIGS. 9 and 10 are diagrams for describing the first plate of FIG. 1.

FIG. 11 is a diagram for describing a port formed on the second plate of FIG. 1.

FIG. 12 is a view for describing a coupling protrusion and a fastening hole formed on the second plate of FIG. 1.

FIG. 13 is a flowchart for describing a method for manufacturing a radar antenna according to a first embodiment of the present disclosure.

FIG. 14 is a flow chart for describing another example of a plate manufacturing step of FIG. 13.

FIG. 15 is a flowchart for describing a method for manufacturing a radar antenna according to a second embodiment of the present disclosure.

FIG. 16 is a flow chart for describing another example of a plate assembling step of FIG. 15.

BEST MODE

Hereinafter, in order to describe in detail to the extent that those skilled in the art can easily practice the technical idea of the present disclosure, the most preferred embodiments of the present disclosure will be described with reference to the accompanying drawings. First, it is to be noted that in giving reference numerals to components of each of the accompanying drawings, the same components will be denoted by the same reference numerals even though they are illustrated in different drawings. Further, in describing exemplary embodiments of the present disclosure, well-known functions or constructions will not be described in detail since they may unnecessarily obscure the understanding of the present disclosure.

Referring to FIG. 1, a radar antenna according to an embodiment of the present disclosure is configured to include a first plate 100 and a second plate 200 that are configured in a plate shape having an inner surface and an outer surface. The first plate 100 and the second plate 200 are coupled so that their inner surfaces face each other to configure the radar antenna.

A waveguide serving to transmit radio waves as electromagnetic waves while minimizing energy loss of electromagnetic waves is formed in an inner space IA of the radar antenna. In this case, the inner space IA of the radar antenna means a space between the inner surface of the first plate 100 and the inner surface of the second plate 200.

Referring to FIGS. 2 and 3, the first plate 100 is formed in a flat plate shape. As an example, the first plate 100 is formed in a rectangular plate shape having an inner surface IS1, an outer surface OS1, a first side S11 as an upper side portion, a second side S12 as a lower side portion, a third side S13 as a left side portion, and a fourth side S14 as a right side portion.

An outer wall 110 is formed on the inner surface IS1 of the first plate 100. The outer wall 110 is formed along an outer circumference of the first plate 100 at the inner surface IS1 of the first plate 100. The outer wall 110 extends in a direction from the inner surface IS1 of the first plate 100 to an inner surface IS2 of the second plate 200. The first plate 100 forms an inner space IA in which a waveguide is disposed while accommodating a portion of the second plate 200 by the inner surface IS1 and the outer wall 110.

In this case, as an example, the outer wall 110 includes a first outer wall 110*a* formed along the first side S11 in the inner surface IS1 of the first plate 100, a second outer wall 110*b* formed along the second side S12 on the inner surface IS1 of the first plate 100, a third outer wall 110*c* formed along the third side S13 on the inner surface IS1 of the first plate 100, and a fourth outer wall 110*d* formed along the fourth side S14 from the inner surface IS1 of the first plate 100.

Referring to FIG. 4, the first plate 100 includes a slot part 120 including a plurality of slots 121. In this case, the slot part 120 may be constituted as a radiating slot part for radiating electromagnetic waves or may be constituted as a receiving slot part for receiving reflected waves generated by reflecting the electromagnetic waves from an object.

In the slot part 120, a plurality of slots 121 are arranged in multiple rows and columns. Each slot 121 is formed to penetrate from an outer surface OS1 to the inner surface IS1 of the first plate 100. Each slot 121 is spaced apart from other adjacent slots 121 by a predetermined distance.

When the slot part 120 constitutes the radiating slot part, the plurality of slots 121 constitutes a plurality of slot columns 122, and the slots 121 arranged in the same slot column 122 are arranged to be displaced from other adjacent slots 121. In other words, the slots 121 constituting the radiating unit are arranged not to be located on the same line as the other slots 121 arranged in the same slot column 122.

For example, the slot part 120 includes the slot column 122 in which the plurality of slots 121 are arranged on the same plane in a vertical direction in the drawing. Some of the slots 121 arranged between an uppermost slot 121*a* and a lowermost slot 121*b* of the slot column 122 are arranged not to span a virtual line VL connecting the uppermost slot 121*a* and the lowermost slot 121*b*. More preferably, the slot column 122 is formed in a zigzag arrangement in which the plurality of slots 121 are continuously formed in a vertical direction at a distance from each other.

The plurality of slots 121 constitutes the plurality of slot columns 122, and the plurality of columns is closer to the upper portion (i.e., the first side S11) of the first plate 100 from the outermost portion to the inner direction. For example, referring to FIG. 5, when the slot part 120 includes a first slot column 122*a* to a sixth slot column 122*f*, if a distance between the first slot column 122*a* and the sixth slot column 122*f* and the first outer wall 110*a* is D1, a distance between a second slot column 122*b* and a fifth slot column 122*e* and the first outer wall 110*a* is D2, and a distance between a third slot column 122*c* and a fourth slot column 122*d* and the first outer wall 110*a* is D3, D1 is greater than D2 and D2 is greater than D3. Here, the distance between the nth slot column 122 and the upper portion of the first plate 100 may be a distance between the uppermost slot 121*a* of the nth slot column 122 and the first outer wall 110*a* of the first plate 100.

Meanwhile, the slot part 120 may constitute a receiving slot part that receives an electromagnetic wave radiated from an external object or an electromagnetic wave reflected from an external object.

Referring to FIGS. 6 and 7, the first plate 100 further includes a partition wall 130 disposed to correspond to the slot part 120. The partition wall 130 is located in the inner space IA of the first plate 100 and protrudes in a direction from the inner surface IS1 of the first plate 100 to the second plate 200 to have a first height. As an example, the partition wall 130 has a first height at which the partition wall 130 contacts the inner surface IS2 of the second plate 200 when the first plate 100 and the second plate 200 are coupled. In this case, in the first plate 100, a thickness of an area formed by the partition wall 130 may be thinner than a thickness of other areas.

The partition wall 130 divides the outer partition wall 132 includes an outer partition wall 132 constituting a waveguide in the inner space IA formed by the inner surface IS1 and the outer wall 110 of the first plate 100 and an inner partition wall 134 dividing the waveguide into a plurality of zones.

The outer partition wall 132 is formed along an outer circumference of the area where the slot part 120 is formed, and constitutes the waveguide in the inner space IA formed by the inner surface IS1 and the outer wall 110 of the first plate 100. The outer partition wall 132 may be configured to include a first outer partition wall 132*a*, a second outer partition wall 132*b*, a third outer partition wall 132*c*, and a fourth outer partition wall 132*d*.

The first outer partition wall 132*a* is disposed on an outer circumference of an area adjacent to the first outer wall 110*a* among the outer circumferences of the area where the slot part 120 is formed. The first outer partition wall 132*a* is disposed to be spaced apart from the uppermost slots 121*a* of each slot column 122 by a predetermined distance.

In this case, the distances between the plurality of slot columns 122 constituting the slot part 120 and the first outer wall 110*a* are different, and since the uppermost slot 121*a* is closer to the first outer wall 110*a* in a direction from the outer portion to the inner portion, the first outer partition wall 132*a* is closer to the upper portion of the first plate 100 in a direction from the outer portion to the inner portion. The first outer partition wall 132*a* is formed in a stair shape having a step, and is formed in, for example, a stair shape that goes up in a direction from the outer portion to the inner portion.

The second outer partition wall 132*b* is disposed on an outer circumference of an area adjacent to the second outer wall 110*b* among the outer circumferences of the area where the slot part 120 is formed. The second outer partition wall 132*b* is spaced apart from the lowermost slot 121*b* of the slot part 120 by a predetermined distance.

The third outer partition wall 132*c* is disposed on an outer circumference of an area adjacent to the third outer wall 110*c* among the outer circumferences of the area where the slot part 120 is formed. In this case, the third outer partition wall 132*c* is disposed to be spaced apart from the slot column 122 on the left side in the drawing by a predetermined distance.

The fourth outer partition wall 132*d* is disposed on an outer circumference of an area adjacent to the fourth outer wall 110*d* among the outer circumferences of the area where the slot part 120 is formed. In this case, the fourth outer partition wall 132*d* is disposed to be spaced apart from the slot column 122 on the right side in the drawing by a predetermined distance.

The first outer partition wall 132*a* to the fourth outer partition wall 132*d* are each disposed at the above-described positions and are connected to each other to form the outer partition wall 132 surrounding the area where the slot part 120 is formed. In this case, as the first plate 100 and the second plate 200 are coupled, the outer partition wall 132 contacts the inner surface IS2 of the second plate 200 to form the waveguide in the inner space IA.

The inner partition wall 134 is formed in plurality, and is disposed within the waveguide formed by the outer partition wall 132. The inner partition wall 134 is disposed between two adjacent slot columns 122 located in the waveguide. Through this, the inner partition wall 134 partitions the waveguide into the plurality of zones, and partitions the waveguide into the same number of zones as the slot columns 122 of the slot part 120.

To this end, the inner partition wall 134 may be configured to include a first inner partition wall 134*a* disposed between the first slot column 122*a* and the second slot column 122*b* of the slot part 120, a second inner partition wall 134*b* disposed between the second slot column 122*b* and the third slot column 122*c* of the slot part 120, a third inner partition wall 134*c* disposed between the third slot column 122*c* and the fourth slot column 122*d* of the slot part 120, and a fourth inner partition wall 134*d* disposed between the fourth slot column 122*d* and the fifth slot column 122*e* of the slot part 120.

The first inner partition wall 134*a* to the fifth inner partition wall 134*e* are integrally formed by having one end portion contacting the first outer partition wall 132*a*. Accordingly, the first outer partition wall 132*a*, the third outer partition wall 132*c*, and the first inner partition wall 134*a* form a first conduit WG1 corresponding to the first slot column 122*a*. The first outer partition wall 132*a*, the first inner partition wall 134*a*, and the second inner partition wall 134*b* form a second conduit WG2 corresponding to the second slot column 122*b*. The first outer partition wall 132*a*, the second inner partition wall 134*b*, and the third inner partition wall 134*c* form a third conduit WG3 corresponding to the third slot column 122*c*. The first outer partition wall 132*a*, the third inner partition wall 134*c*, and the fourth inner partition wall 134*d* form a fourth conduit WG4 corresponding to the fourth slot column 122*d*. The first outer partition wall 132*a*, the fourth inner partition wall 134*d*, and the fifth inner partition wall 134*e* form a fifth conduit WG5 corresponding to the fifth slot column 122*e*. The first outer partition wall 132*a*, the fourth outer partition wall 132*d*, and the fifth inner partition wall 134*e* form a sixth conduit WG6 corresponding to the sixth slot column 122*f*.

The other end portions of the first inner partition wall 134*a* to the fifth inner partition wall 134*e* are spaced apart from the second outer partition wall 132*b* by a predetermined distance. In this case, as an example, the separation distance between the other end portion of the first inner partition wall 134*a* to the fifth inner partition wall 134*e* and the second outer partition wall 132*b* is the same will be described. Accordingly, a seventh conduit WG7 is formed between the other end portions of the first inner partition wall 134*a* to the fifth inner partition wall 134*e* and the second outer partition wall 132*b*.

Referring to FIG. 8, the first plate 100 further includes a plurality of coupling protrusions 140 and a plurality of first fastening holes 150. The coupling protrusion 140 is formed of one of a first coupling protrusion 142 and a second coupling protrusion 144, and the first plate 100 includes a plurality of first coupling protrusions 142 and a plurality of second coupling protrusions 144. The plurality of first fastening holes 150 are formed to penetrate between the outer surface OS1 and the inner surface IS1 of the first plate 100.

The first coupling protrusion 142 has a second height. The first coupling protrusion 142 has a first through hole 142*a* into which a fixing means (not illustrated) is inserted when the first plate 100 and the second plate 200 are coupled.

The second coupling protrusion 144 has a third height higher than the second height. The second coupling protrusion 144 has a through hole into which the fixing means (not illustrated) is inserted when the first plate 100 and the second plate 200 are coupled. In this case, an insert nut 144*a* is molded into the second coupling protrusion 144, and a second through hole 144*b* is formed by the insert nut 144*a*.

Here, the first height and the second height are heights on an imaginary line vertically penetrating through the first plate 100 and the second plate 200, and is, for example, a length (height) in the direction from the inner surface IS1 of the first plate 100 to the inner surface IS2 of the second plate 200.

A plurality of first fastening holes 150 are formed to penetrate through the first plate 100. The plurality of first fastening holes 150 are formed to penetrate between the inner surface IS1 and the outer surface OS1 of the first plate 100 and formed so as not to protrude from the inner surface IS1 of the first plate 100.

Referring to FIGS. 9 and 10, the second plate 200 is formed in a flat plate shape. As an example, the second plate 200 is formed in a rectangular plate shape having the inner surface IS2, the outer surface OS2, a first side S21 as an upper side portion, a second side S22 as a lower side portion, a third side S23 as a left side portion, and a fourth side S24 as a right side portion.

The second plate 200 includes a first inner surface IS21 and a second inner surface IS22 positioned lower than the first inner surface IS21.

The first inner surface IS21 contacts the partition wall 130 of the first plate 100 when the first plate 100 and the second plate 200 are coupled. In this case, the waveguide is formed through the first inner surface IS21 of the second plate 200 and the inner surface IS1 of the first plate 100 and the partition wall 130.

The second inner surface IS22 contacts the outer wall 110 of the first plate 100 when the first plate 100 and the second plate 200 are coupled. The second inner surface IS22 is formed along the outer circumference (first side S21 to fourth side S24) of the inner surface IS2 of the second plate 200. Accordingly, a step is formed between the first inner surface IS21 and the second inner surface IS22, and when the first plate 100 and the second plate 200 are coupled, the first inner surface IS21 is accommodated in the inner space IA of the first plate 100.

The second plate 200 is formed with a port 210. The port 210 is formed to penetrate between the first inner surface IS21 and the outer surface OS2 of the second plate 200.

As an example, referring to FIG. 11, the port 210 is configured to include a first port 210*a* and a second port 210*b*.

The first port 210*a* is formed starting from the outer surface OS2 of the second plate 200 toward the inner surface IS2 of the second plate 200. The first end portion of the first port 210*a* is disposed on the outer surface OS2 of the second plate 200, and the second end portion of the first port 210*a* is disposed between the inner surface IS2 and the outer surface OS2 of the second plate 200.

The second port 210*b* is formed starting from the inner surface IS2 of the second plate 200 toward the outer surface IS2 of the second plate 200. The first end portion of the second port 210*b* is disposed on the second inner surface IS22 of the second plate 200, and the second end portion of the second port 210*b* is disposed between the inner surface and the outer surface OS2 of the second plate 200 IS2.

The second port 210*b* has a shape corresponding to the seventh conduit WG7 of the waveguide. The second port 210*b* is disposed at a position overlapping the seventh conduit WG7 of the first plate 100 when the first plate 100 and the second plate 200 are coupled. For example, the second port 210*b* may be formed in a rectangular shape in which the length of the side parallel to the second side S22 (or the first side S21) is longer than that of the side parallel to the third side S23 (or the fourth side S24).

The first port 210*a* and the second port 210*b* are arranged so that the second end portions contact each other inside the second plate 200 to form one port 210. Here, the port 210 may be a transmission port for transmitting electromagnetic waves to the waveguide, or a reception port for receiving electromagnetic waves input from the waveguide.

Referring to FIG. 12, the second plate 200 further includes a plurality of coupling grooves 220 and a plurality of second fastening holes 230. The coupling groove 220 is formed of one of the first coupling groove 222 and the second coupling groove 224, and the second plate 200 has the plurality of first coupling grooves 222 and the plurality of second coupling grooves 224. The plurality of second fastening holes 230 are formed to penetrate between the outer surface OS2 and the inner surface IS2 of the second plate 200.

The first coupling groove 222 is formed in the direction from the inner surface IS2 to the outer surface OS2 of the second plate 200 and has a first depth. The first coupling groove 222 has the first depth corresponding to the height (i.e., a second height) of the first coupling protrusion 142. The first coupling groove 222 is disposed to contact the first coupling protrusion 142 when the first plate 100 and the second plate 200 are coupled, and is provided with a third through hole 222*b* into which the fixing means is inserted. In this case, an insert nut 222*a* is molded into the first coupling groove 222, and the third through hole 222*b* is formed by the insert nut 222*a*.

The second coupling groove 224 is formed in the direction from the inner surface IS2 to the outer surface OS2 of the second plate 200 and has a second depth. The second coupling groove 224 has the second depth corresponding to the height (i.e., a third height) of the second coupling protrusion 144. The second coupling groove 224 is disposed to contact the second coupling protrusion 144 when the first plate 100 and the second plate 200 are coupled, and is provided with a fourth through hole 224*a* into which the fixing means is inserted.

A plurality of second fastening holes 230 are formed to penetrate through the second plate 200. The plurality of second fastening holes 230 are formed to penetrate between the inner surface IS2 and the outer surface OS2 of the second plate 200 and formed so as not to protrude from the inner surface IS2 and the outer surface OS2 of the second plate 200.

When the first plate 100 and the second plate 200 are coupled, the third through hole 222*b* overlaps the first through hole 142*a*, and the fourth through hole 224*a* overlaps the second through hole 144*b*, and the second fastening hole 230 overlaps the first fastening hole 150.

Here, although the fixing means is not illustrated in the drawings of the present disclosure, briefly described, the fixing means may be configured as follows.

The first fixing means may be constituted a bolt that penetrates through the first through hole 142*a* and the third through hole 222*b* in a direction from the first plate 100 to the second plate 200 and is fastened with the insert nut 222*a* of the second plate 200.

The second fixing means may be constituted as a bolt that penetrates through the fourth through hole 224*a* and the second through hole 144*b* in a direction from the second plate 200 to the first plate 100 and is fastened with the insert nut 222*a* of the first plate 100.

The third fixing means may be constituted as a bolt that penetrates through the second fastening hole 230 and the first fastening hole 150 in a direction from the second plate 200 to the first plate, and a nut that is disposed on the outer surface OS1 of the first plate 100 to be fastened with the bolt. The third fixing means may be constituted as a bolt that penetrates through the first fastening hole 150 and the second fastening hole 230 in a direction from the first plate 100 to the second plate, and a nut that is disposed on the outer surface OS2 of the second plate 200 to be fastened with the bolt.

Referring to FIG. 13, the method for manufacturing a radar antenna according to the first embodiment of the present disclosure includes a plate manufacturing step (S110), a shielding layer forming step (S120), a curing step (S130), and a plate assembling step (S140).

In the plate manufacturing step (S110), the first plate 100 and the second plate 200 are manufactured through a resin injection process. In the plate manufacturing step (S110), the first plate 100 and the second plate 200 are manufactured by injecting the plate through the in-molding injection process of molding the insert nuts 144*a* and 222*a* on a plate made of resin and then cooling the plate. Here, in the plate manufacturing step (S110), as an example, the first plate 100 and the second plate 200 are manufactured by using a resin such as polypropylene (PP), polyethylene (PE), or polyimide (PI).

In the shielding layer forming step (S120), a shielding layer is formed on the surfaces of the first plate 100 and the second plate 200. In the shielding layer forming step (S120), the shielding layer is formed on the surfaces of the first plate 100 and the second plate 200 by the metal plating process. Here, in the shielding layer forming step (S120), one metal of tin (Sn), nickel (Ni), gold (Au), and silver (Ag) or a mixed metal of two or more thereof is plated to form the shielding layer on the surfaces of the first plate 100 and the second plate 200 as an example.

In the curing step (S130), the first plate 100 and the second plate 200 are cured. In the curing step (S130), the first plate 100 and the second plate 200 are cured through one of a compression process and a thermal aging process. In this case, in the curing step (S130), the first plate 100 and the second plate 200 may be cured by simultaneously performing the compression process and the thermal aging process.

In the plate assembling step (S140), the radar antenna is manufactured by assembling the hardened first plate 100 and second plate 200. In the plate assembling step (S140), the first plate 100 and the second plate 200 are stacked, and bolts serving as the fixing means are fastened to the insert nut 144*a* in-molded in the first plate 100 and/or the insert nut 222*a* in-molded in the second plate 200 to assemble the first plate 100 and the second plate 200.

Meanwhile, the plate manufactured in the plate manufacturing step (S110) may be warped during the cooling process after the insert nuts 144*a* and 222*a* inject the in-molded plate through the in-molding injection process. In other words, in the cooling process after the injection, the plate may be warped due to a difference in cooling degree (time) occurs between the area where the insert nuts 144*a* and 222*a* are in-molded and other areas, and the difference in cooling degree according to the position of the plate. In this case, the signal leakage of the electromagnetic wave signal may occur due to a gap in the waveguide, and as a result, the antenna performance may deteriorate.

Accordingly, in the plate manufacturing step (S110), the first plate 100 and the second plate 200 may be manufactured through the insert injection process in order to prevent the warping of the plate.

As an example, referring to FIG. 14, the plate manufacturing step (S110) may include the plate injection step (S112) and the insert nut insertion step (S114).

In the plate injection step (S112), the plate is injected through the resin injection process. In this case, in the plate injection step (S112), the insert nuts 144*a* and 222*a* are not molded, and the plate having the insertion space into which the insert nuts 144*a* and 222*a* are to be inserted is injected. The plate injected in the plate injection step (S112) is cooled through the cooling process.

In the insert nut insertion step (S114), the insert nuts 144*a* and 222*a* are inserted into the plate that has undergone the cooling process. In the insert nut insertion step (S114), the insert nuts 144*a* and 222*a* are inserted into the plate insertion space, and the first plate 100 and the second plate 200 are manufactured through these processes.

As such, the method for manufacturing a radar antenna may prevent the deterioration in the antenna performance due to the signal leakage by inserting the insert nuts 144*a* and 222*a* after injecting the plate to prevent the warping of the plate from occurring.

Referring to FIG. 15, a method for manufacturing a radar antenna according to the second embodiment of the present disclosure includes a plate manufacturing step (S310), a shielding layer forming step (S320), a bonding area forming step (S330), and a plate assembling step (S340).

In the plate manufacturing step (S310), the plate is injected through the resin injection process. The plate injected in the plate injection step (S310) is cooled through the cooling process. Here, in the plate manufacturing step (S310), as an example, the first plate 100 and the second plate 200 are manufactured by using a resin such as polypropylene (PP), polyethylene (PE), or polyimide (PI).

In the shielding layer forming step (S320), the shielding layer is formed on the surfaces of the first plate 100 and the second plate 200. Specifically, the shielding layer is formed by the metal plating process on the inner surface (IS1), outer surface (OS1), and side surfaces (S11 to S14) of the first plate 100, and on the inner surface (IS2), outer surface (OS2), and side surfaces (S21 to S24) of the second plate 200. Here, in the shielding layer forming step (S320), one metal of tin (Sn), nickel (Ni), gold (Au), and silver (Ag) or a mixed metal of two or more thereof is plated to form the shielding layer on the surfaces of the first plate 100 and the second plate 200 as an example.

In the bonding area forming step (S330), the bonding area is formed on the first plate 100 and the second plate 200 by removing a portion of the shielding layer through a cutting process. In the bonding area forming step (S330), a portion of the shielding layer is removed through a laser cutting process. In other words, in the bonding area forming step (S330), the first plate 100 and the second plate 200 form the bonding area by removing a portion of the shielding layer to expose a resin.

In the plate assembling step (S340), the radar antenna is assembled by bonding the first plate 100 and the second plate 200 through the ultrasonic welding process. In this case, in the plate assembling step (S340), the first plate 100 and the second plate 200 are melted in the bonding area through ultrasonic waves in the stacked state, thereby bonding the first plate 100 and the second plate 200.

Meanwhile, in the plate assembling step (S340), the first plate 100 and the second plate 200 may be bonded by the epoxy curing method.

To this end, as illustrated in FIG. 16, the plate assembling step (S340) may include a bonding layer forming step (S341), a bonding step (S342), and a curing step (S343).

In the bonding layer forming step (S320), the bonding layer is formed on the bonding area of the first plate 100 and the second plate 200. In the bonding layer forming step (S341), epoxy is discharged to the bonding area of the first plate 100 and the second plate 200 through an epoxy dispenser to form the bonding layer. In this case, in the bonding layer forming step (S341), the bonding layer may be formed in the bonding area of one of the first plate 100 and the second plate 200.

In the bonding step (S342), the bonding layer is bonded by applying pressure while the first plate 100 and the second plate 200 are stacked. In the bonding step (S342), the bonding layers of the first plate 100 and the second plate 200 may be bonded to each other, or the bonding layer of the first plate 100 may be bonded to the bonding area of the second plate 200, or the bonding layer of the second plate 200 may be bonded to the bonding area of the first plate 100.

In the curing step (S343), the bonding layer is cured in while the first plate 100 and the second plate 200 are stacked. In the curing step (S343), as an example, the bonding layer is cured through the oven curing process or the natural curing process. The curing step (S343) is illustrated and described as a process separate from the bonding step (S342), but may be performed simultaneously in the manufacturing process.

Although the preferred embodiments according to the present disclosure have been described above, modifications can be made in various forms, and it is understood that those skilled in the art can make various modifications and variations without departing from the scope of the claims of the present disclosure.

The invention claimed is:

1. A method for manufacturing a radar antenna, comprising:

manufacturing a plate-shaped first plate and a plate-shaped second plate, wherein the plate-shaped first plate includes a first coupling protrusion and a second coupling protrusion, wherein the second coupling protrusion protrudes higher than the first coupling protrusion, wherein a nut is in-molded in the second coupling protrusion, wherein the plate-shaped second plate includes a first coupling groove and a second coupling groove, wherein the first coupling groove has a depth corresponding to a height of the first coupling protrusion and is configured to receive the first coupling protrusion, wherein the second coupling groove has a depth corresponding a height of the second coupling protrusion and is configured to receive the second coupling protrusion, and wherein a nut is in-molded in the first coupling groove, forming a shielding layer on surfaces of the first plate and surfaces of the second plate;

curing the first plate and the second plate on which the shielding layer is formed through at least one of a compression process and a thermal aging process; and assembling the first plate and the second plate cured in the curing.

2. The method for claim 1, wherein, in the manufacturing, the first plate and the second plate in which the insert-nut is in-molded are injected through an in-molding injection process, and then cooled.

3. The method for claim 1, wherein the manufacturing includes:

injecting the first plate and the second plate in which an insertion space is formed; and inserting the nuts into the insertion spaces of the first plate and the second plate.

4. A method for manufacturing a radar antenna, comprising:

manufacturing a first plate and a second plate through an injection process, wherein the first plate includes a first coupling protrusion and a second coupling protrusion, wherein the second coupling protrusion protrudes higher than the first coupling protrusion, wherein a nut is in-molded in the second coupling protrusion, wherein the second plate includes a first coupling groove and a second coupling groove, wherein the first coupling groove has a depth corresponding to a height of the first coupling protrusion and is configured to receive the first coupling protrusion, wherein the second coupling groove has a depth corresponding to a height second coupling protrusion and is configured to receive second coupling protrusion, and wherein a nut is in-molded in the first coupling groove;

forming a shielding layer on surfaces of the first plate and surfaces of the second plate;

forming a bonding area on the first plate and the second plate by cutting a portion of the shielding layer of the first plate and the second plate; and bonding the first plate and the second plate.

5. The method for claim 4, wherein, in the bonding, the first plate and the second plate are bonded by melting a bonding area of the first plate and the second plate through an ultrasonic welding process.

6. The method for claim 4, wherein the bonding includes:

forming the bonding layer on the bonding area of the first plate and the second plate through an epoxy discharging process;

attaching the bonding layer by applying pressure in a stacked state of the first plate and the second plate; and curing the bonding layer through one of an oven curing process and a natural curing process.

* * * * *